United States Patent Office 2,965,549
Patented Dec. 20, 1960

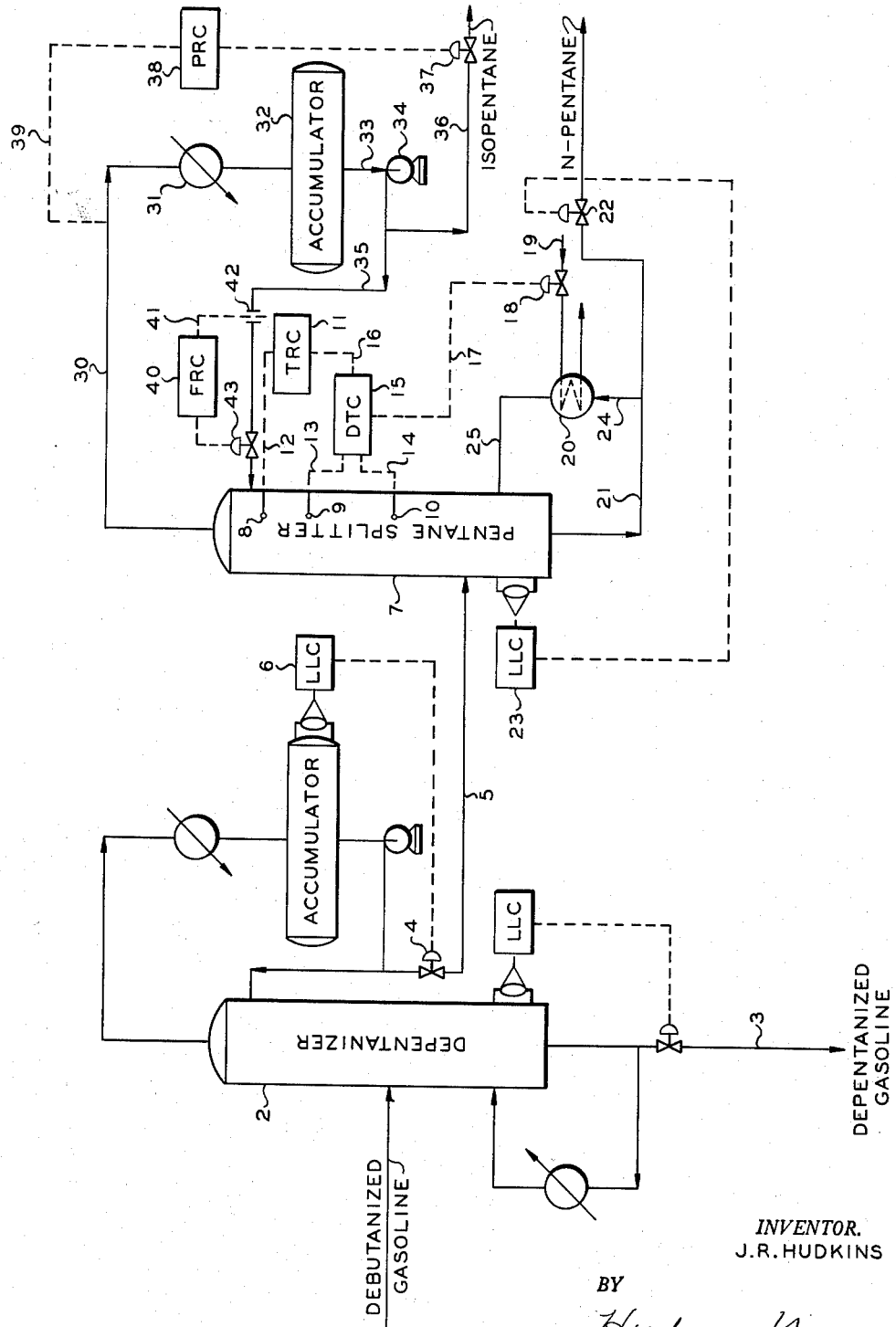

2,965,549
DISTILLATION COLUMN CONTROL
Jack R. Hudkins, Old Ocean, Tex., assignor to Phillips Petroleum Company, a corporation of Delaware
Filed Mar. 22, 1956, Ser. No. 573,140
15 Claims. (Cl. 202—40)

This invention relates to distillation. In one of its aspects, this invention relates to a method and to an apparatus for controlling a distilling or fractionating column in which a differential temperature controller is employed, the said controller being so arranged, adapted and related to a temperature controller acting at another portion of the column as to be reset thereby as conditions require. In another, more specific, aspect, the invention relates to application of a temperature controller to reset or to override a differential temperature controller responsive to the fractionating section of a distillation tower, the temperature controller being responsive to the temperature at a top portion of said tower. In a further, more specific, aspect, the invention relates to the application of a temperature controller to reset or to override a differential temperature controller responsive to the stripping section of a distillation tower, the said temperature controller being responsive to a temperature in the bottom of the tower.

The control of distilling or fractionating columns has been practiced for a long time. All kinds of controls have been advocated and many of these have been employed. Even at the present time, the satisfactory control of distilling columns, the products from which are to be specification products, presents problems which have not been entirely satisfactorily solved. For example, with variations in feed stock composition, the temperature difference across a given section of a tower may remain constant and yet the overhead product may go off specification or loss of product may occur out through the bottom of the tower and this will be even though a differential temperature controller is employed.

It is an object of this invention to provide a method and apparatus embodying improved control of a fractionating or distilling column. It is another object of this invention to improve the operation of a distilling or fractionating column in which a differential temperature controller is employed. It is a further object of the invention to provide a method and means for fractionating column control when feed stock composition variations are occurring.

According to this invention, there are provided a method and means of controlling a fractionating column using a differential temperature controller, the said method and means involving a temperature controller reset or override of the differential temperature controller, the reset or override being responsive to a temperature in the column which is not at the locus of any of the means comprising the said differential temperature controller. Thus, in one specific execution of the invention, a differential temperature controller is reset by a temperature controller responsive to the temperature at the top of a fractionating column. In another specific execution of the invention, a differential temperature controller is reset by a temperature controller responsive to the temperature at a bottom portion of a fractionating column.

The differential temperature controller which according to this invention is reset by a temperature controller, as described herein, usually is employed to adjust the amount of heat to the bottom of the fractionating column. It will be obvious to one skilled in the art in possession of this disclosure that the differential temperature controller can be employed otherwise.

In the drawing there is shown, schematically, an operation and an apparatus, both of which are according to the invention. The illustrated embodiment of the invention is particularly applicable to and for this reason will be described in connection with, a fractionation in which the two components being separated have close boiling points, specifically iso and normal pentane. Obviously, the embodiment and for that matter, the inventions generally are applicable to other distillation or fractionation operations. Another such operation would be a separation of normal and isobutanes. Still other separations which may be accomplished include: separation, in particular, of binary mixtures such as: separaton of different olefins (ethylene-propylene, etc.), separation of different paraffins (ethane-propane, propane-butane, etc.), separation of olefin-paraffin (ethylene-ethane, propylene-propane, etc.), and separation of isoparaffin-normal paraffin as set out hereinabove. This separation, of course, need not be necessarily limited to close-boiling fractions.

Referring now to the drawing, in column 2, which is a depentanizer, there is charged a gasoline feed stream. The bottoms effluent 3 therefrom is depentanized gasoline product. The overhead effluent from column 2 is comprised of isopentane and normal pentane and is passed by way of the condenser to the overhead accumulator which is operated on liquid level controller 6 which operates valve 4 in line 5. From the accumulator there is withdrawn a charge stream 5 for tower 7, which tower is a pentane splitter in this specific application. In tower 7 there are provided temperature sensing elements 8, 9, and 10. Element 8 transmits a signal of the usual type to recording temperature controller 11. The transmission of the signal is indicated by line 12. In similar manner, elements 9 and 10 transmit, by way of lines 13 and 14, signals to differential temperature controller 15. Recording temperature controller 11 is operatively connected to differential temperature controller 15 by way of pneumatic set line 16. Differential temperature controller 15 is operatively connected by way of pneumatic line 17 to valve 18 on steam line 19 which feeds steam to reboiler 20. Bottoms from tower 7 leave by way of line 21 provided with valve 22, which is automatically controlled by liquid level controller 23 responsive to the level in the bottom of tower 7. By way of line 24, reboiler 20, and line 25, the bottom of tower 7 is reboiled. Overhead from tower 7 leaves by way of line 30, passes through condenser 31, and enters reflux drum 32 from which it leaves by way of line 33 and is pumped by way of pump 34 in part back to the tower as reflux by way of line 35 and in part by way of line 36 to storage. Line 36 is equipped with valve 37 which is operatively responsive to pressure recorder controller 38 which in turn is responsive to the pressure in line 30 by way of line 39. Line 35 is equipped with flow recorder controller 40 which, by way of line 41 and orifice plate 42, is responsive to the flow in line 35. In turn, valve 43 in line 35 is operatively responsive to flow recorder controller 40.

The operation of the invention, as illustrated in the drawing just described is substantially as follows. There are two cases which can be considered. In the first case, there will be considered an increase of the proportion of isopentane in the feed to tower 7. In this instance, there is a need for more vaporization since obviously the percentage of isopentane in the feed has increased and it is desired to remove as nearly as possible all of the isopentane from the said feed. In this instance, the temperature in the lower part of the tower above the feed entry tends to go down. This results in a lessening of the temperature differential between elements 9 and 10. The differential temperature controller elements 9 and 10, sensing this, will immediately add reboiler heat by way of valve 18 to maintain constant temperature differential, thus preventing loss of isopentane out the bottom of tower 7. Then, as the top temperature starts to go up as a result of the constant temperature difference, the top temperature controller will reset the differential temperature controller for a lower value which will reduce the steam and bring the top temperature back on control. In the second instance which is being considered, the percentage of isopentane in the feed is now lower. That is, the proportion of iso to normal pentane in the feed to column 7 has been reduced. Directly this has happened, the temperature in the lower part of the tower will tend to increase. The temperature differential will go up. The differential temperature controller will reduce the steam load to prevent overhead product from going off specification. Then as the temperature at the top of the tower begins to fall off as a result of the constant temperature difference, the temperature controller will reset the differential temperature controller for a higher value which will increase the steam and bring the top temperature back on control.

It will be understood by those skilled in the art in possession of this disclosure that the example which is given is for a tower where the purity of the overhead product is of prime importance. It will be equally clear to them that the same principal can be applied where the purity of the bottom product is more critical than that of the top product in which event, the temperature differential controller elements 9 and 10 will be located in the stripping section of the tower and will be reset by a temperature controller located in the bottom of the tower.

It will be obvious to one studying this disclosure and skilled in the art of employing differential temperature controllers that the application of a temperature recorder controller to reset a differential temperature controller will give the high sensitivity control of a differential temperature controller without the danger of off specification product or loss of product. As described, the system enables the correction for variations in composition of feed which the differential temperature controller alone cannot accomplish. Furthermore, this control system will also correct column conditions for variations in feed rates.

*Example*

A specific example of the operating conditions, streams amounts and compositions, etc., are set out hereinbelow:

Line 5 (iso-pentane and n-pentane):
  Rate, barrels per day _____ 1560
  Composition, volume percent—
    n-Butane _____ 1.0
    Iso-pentane _____ 48.4
    n-Pentane _____ 48.9
    Hexanes and heavier _____ 1.7
Line 36 (iso-pentane):
  Rate, barrels per day _____ 768
  Composition, volume percent—
    n-Butane _____ 2.1
    Iso-pentane _____ 93.1
    n-Pentane _____ 4.8
Line 21 (n-pentane):
  Rate, barrels per day _____ 792
  Composition, volume percent—
    Iso-pentane _____ 4.9
    n-Pentane _____ 91.6
    Hexanes and heavier _____ 3.5
Tower 7:
  Top of tower (position 8)—
    Temperature, °F. _____ 144
    Pressure, p.s.i.g. _____ 30
  4th tray (position 9)—Temperature, °F. ____ 146.5
  15th tray (position 10)—Temperature, °F. _ 150
  (the differential temperature being 3.5)
  Reboiler line 25—Temperature, °F. _____ 167

The top tray is to be maintained at 144° F. to make the tower produce $iC_5$ of desired purity. 144° F. is set on the set point of the TRC unit and the indicator pen seeks this 144° F. point. The air output from this TRC is supplied to the set point (Pneumaticset Unit) in the ΔTRC unit. Now if the $iC_5$ content of the charge increases (more lighter component in the feed), the ΔT between the trays at which temperature is sensed to determine said ΔT decreases. This decrease in ΔT moves the indicator pen away from the set point (at 3.5) and in so moving it actuates the valve to increase heat to the reboiler until the pen seeks the 3.5 set point. As heat travels up the tower, the top temperature will pass above 144° F. When this temperature rises, the indicating pen moves away from the 144° F. set point, and to correct back to 144° F., it resets the set point on the ΔTRC (via air signal), to a lower value. This now lower value, e.g., 3.2° ΔT, makes the ΔTRC indicator pen seek 3.2 (not the 3.5) by actuating a pinching back on the reboiler heat. The system, now with lighter feed, still has the desired top temperature of 144° F., and a new ΔT between the 4th and 15th tray of 3.2° F. which allows the introduction of the proper amount of reboiler heat for the new feed.

In the practice of the invention, one skilled in the art can select available equipment with which to construct a controlling mechanism adapted to carry out said invention. For example, he can use the following available Foxboro controllers which are included among others in "Foxboro Model 40 Controller," Bulletin 461 (10M-11-51). The TRC temperature recorder controller "A862" on page 11 of the bulletin can be combined with the differential temperature recorder controller "A871" of page 15 to which there has been added a pneumatic set control point unit "A873" of page 16. Thus, the temperature recorder controller will supply the air output to the pneumatic set control point unit which in turn will be operative to control the differential recorder controller to reset the same.

Reasonable variation and modification are possible within the scope of the foregoing disclosure, drawing, and the appended claims to the invention, the essence of which is that a temperature controller operating to reset a differential temperature controller in a fractionating column has been set forth, as described.

I claim:
1. In a distilling column, in combination, means for feeding a feed to be distilled to said column, means for removing liquid from the column at a lower portion thereof, means for removing distillate from the column in an upper portion thereof, means for supplying heat to a lower portion of said column to heat liquid therein contained, a differential temperature controller means operatively connected with a portion of the inside of said column and with said means for supplying heat, and a temperature controller means sensing a temperature at a locus away from any point at which said differential temperature controller means is sensing temperature, means for adjusting the set point of said differential temperature controller operatively connected with said differential temperature controller and with said temperature controller to adjust said set point responsive to the temperature at said locus.

2. An apparatus according to claim 1 wherein said differential temperature controller means is located in the fractionating section of said column and said temperature controller means is located above said differential temperature controller means.

3. An apparatus according to claim 1 wherein said differential temperature controller means is located in the stripping section of said column and said temperature controller means is located below said differential temperature controller means.

4. An apparatus according to claim 1 wherein a liquid level controller means is operatively installed to control the liquid level in the lower portion of said column.

5. An apparatus according to claim 1 wherein said means for removing distillate is provided with a flow regulator controller means.

6. In a fractionating column, in combination, feeding means to supply feed to said column, a distillate and a bottoms outlet operatively connected to said column, a reboiler means so adapted as to supply heat to liquid in the bottom of said column, a liquid level control means so adapted as to control the level of said liquid, heating medium feeding valve means connected to said reboiler to supply heat thereto, a differential temperature controller means having at least two sensing elements in said column above the feeding means, means for relaying to said valve means a signal which is a function of a temperature difference sensed by said sensing means, a temperature controller sensing means at a top portion of said column remote from said two sensing elements, means for relaying a signal which is a function of temperature sensed by said temperature controller sensing means to said differential temperature controller means and to means to adjust the set point of said differential temperature controller means responsive to said temperature sensed by said temperature controller sensing means, and a flow regulator means to regulate a flow of distillate in said distillate outlet.

7. In a fractionating column, in combination, feeding means to supply feed to said column, a distillate and a bottoms outlet operatively connected to said column, a reboiler means so adapted as to supply heat to liquid in the bottom of said column, a liquid level control means so adapted as to control the level of said liquid, a heating medium feeding valve means connected to said reboiler to supply heat thereto, a differential temperature controller means having at least two sensing elements in said column below the feeding means, means for relaying to said valve means a signal which is a function of a temperature difference sensed by said sensing means, a temperature controller sensing means at a lower portion of said column remote from said two sensing elements, means for relaying a signal which is a function of a temperature sensed by said temperature control sensing means to said differential controller means, and means to adjust the set point of said differential temperature controller means responsive to said temperature sensed by said temperature controller sensing means, and a flow regulator means to regulate flow of distillate in said distillate outlet.

8. A method for controlling a fractionator column, adapted to control fractionation of a feed continuously fed thereto at a set or a varying rate even when said feed has a varying composition, yet to produce at least one product stream to specification without losing product yield which comprises controlling a temperature gradient between two points in said column by controlling of the rate of supply of heat to the contents of said column responsive to changes in said gradient and changing the value of said temperature gradient responsive to a temperature at a locus outside said two points.

9. A method for fractionating a liquid which comprises feeding said liquid to a first locus in a fractionating zone, removing distillate from said zone at a locus on one side of said first locus, removing distillation residue from said zone at another locus to another side of said first locus, supplying heat to liquid in said zone responsive to the value of a differential of temperature between two points in said zone located between the removal of distillate and removal of residue loci, adjusting the value of said temperature differential responsive to a temperature in said zone outside of said two points.

10. A method for fractionating a liquid which comprises feeding said liquid to a fractionating zone at a first locus, removing distillate from said zone at one locus, removing distillation residue from said zone at another locus, supplying heat to liquid in said zone responsive to the value of a differential of temperature between two points in said zone located between said first locus and the locus at which distillate is removed and adjusting the value of said temperature differential responsive to a temperature above said two points.

11. A method for fractionating a liquid which comprises feeding said liquid to a fractionating zone at a first locus, removing distillate from said zone at one locus, removing distillation residue from said zone at another locus, supplying heat to liquid in said zone responsive to the value of a differential of temperature between two points in said zone located between said first locus and the locus at which distillation residue is removed and adjusting the value of said temperature differential responsive to a temperature below said two points.

12. A method of fractionating a liquid to produce a product meeting specifications regardless of variations in feed composition and/or rate which comprises feeding said liquid to a fractionating zone at one locus thereof situated between a distillate removal locus and a residue removal locus, supplying heat to liquid in said zone responsive to the value of a temperature differential between two points in said zone situated between said distillate removal locus and said residue removal locus, maintaining a constant liquid level in said zone by removing residue therefrom, removing distillate at a regulated flow rate from said zone and adjusting the value of said temperature differential responsive to the temperature at a locus outside said two points.

13. A method of fractionating a liquid according to claim 12 wherein the said two points are situated above the feed to said zone and said temperature differential is adjusted responsive to a temperature at a locus above said two points in said zone.

14. A method of fractionating a liquid according to claim 12 wherein the said two points in said zone are situated below the feed to said zone and said temperature differential is adjusted responsive to a temperature at a locus below said two points in said zone.

15. In a distillation column, in combination, a feed inlet, a liquid outlet at a lower portion of said column, a distillate outlet at an upper portion of said column, means for supplying heat to a lower portion of said column, regulating means for said means for supplying heat, a first controller responsive to differential temperature operatively connected with said regulating means, first and second temperature sensing means responsive to temperatures at spaced points within said column and operatively connected with said first controller, set point adjusting means operatively connected with said first controller, a second controller responsive to temperature, operatively connected with said set point adjusting means, a third temperature sensing element responsive to temperature at a point spaced from said first and second temperature sensing elements, operatively connected with said temperature controller.

References Cited in the file of this patent
UNITED STATES PATENTS

| | | |
|---|---|---|
| 2,022,809 | Kramer | Dec. 3, 1935 |
| 2,252,550 | Bragg | Aug. 12, 1941 |
| 2,476,280 | Bragg et al. | July 19, 1949 |
| 2,580,651 | Boyd | Jan. 1, 1952 |
| 2,599,133 | Schilling | June 3, 1952 |
| 2,684,326 | Boyd | July 20, 1954 |
| 2,709,678 | Berger | May 31, 1955 |

OTHER REFERENCES

"Instruments and Process Control," N.Y. State Vocational and Practical Arts Assoc., pages 11 to 18, 1945.